Feb. 26, 1957   L. A. KNOX   2,782,989
RECORD SENSING APPARATUS
Filed Dec. 30, 1953
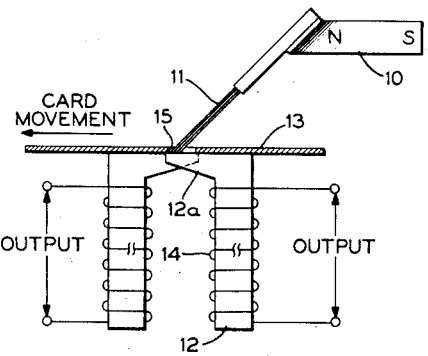
FIG. 1
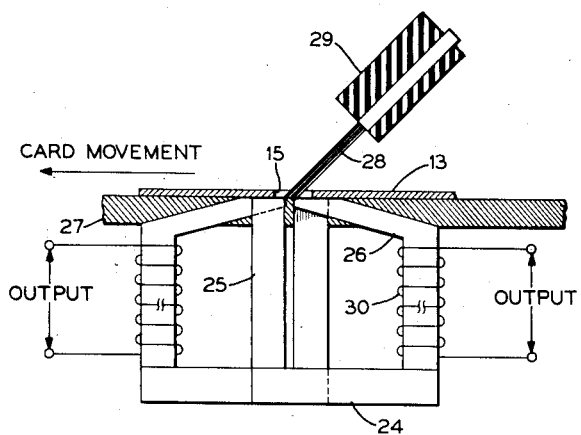
FIG. 2
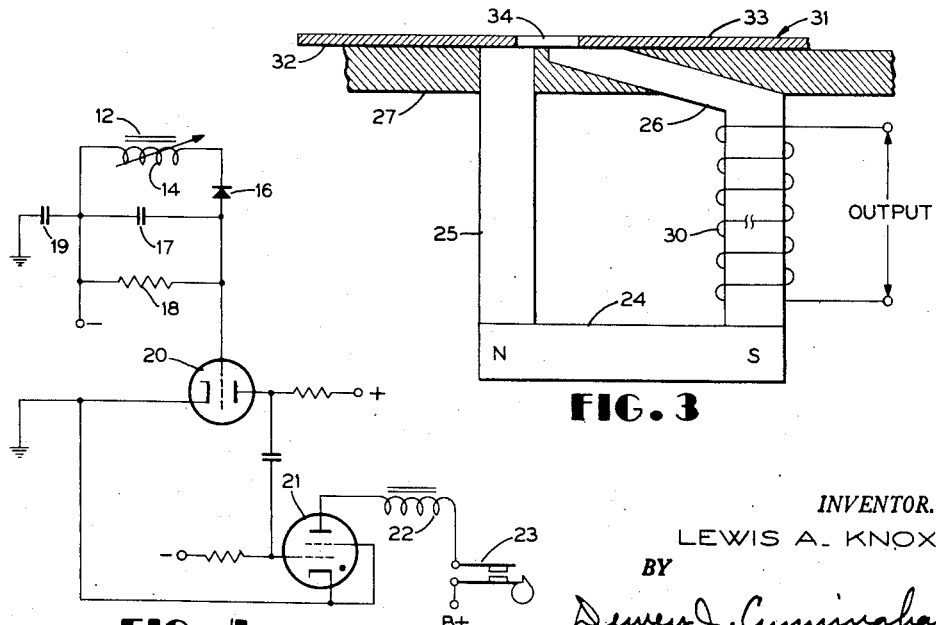
FIG. 3
FIG. 4
INVENTOR.
LEWIS A. KNOX
BY Dewey J. Cunningham
ATTORNEY

United States Patent Office 2,782,989
Patented Feb. 26, 1957

2,782,989

RECORD SENSING APPARATUS

Lewis A. Knox, Owego, N. Y., assignor to International Business Machines Corporation, New York, N. Y., a corporation of New York Application December 30, 1953, Serial No. 401,301

7 Claims. (Cl. 235—61.11)

This invention relates to record analyzing apparatus and, more particularly, to electrical sensing devices of the type employed in record controlled electrical accounting machines to detect value-representing perforations disposed at different locations on the records.

Devices of this nature which are of common knowledge in the art comprise a row of electrical brushes and a contact roll or bar adjacent thereto. Records in the form of tabulating cards with holes punched in them to represent data are fed in succession between the contact bar and the brushes. With this arrangement, when one of the brushes drops through a hole in the card it makes electrical contact with the bar to establish a predetermined machine circuit. A set of circuit breaking devices are usually placed in series with the brush circuits and are timed so as to control the making and breaking of these circuits as the brushes contact the holes in the card.

A number of problems arise with regard to the above-described sensing arrangement. The contact roll, when viewed microscopically is somewhat rough and contains very small recesses. These recesses collect oil films, wax films, lint, and various materials from the record cards. Under the action of electrical current flow sputtering and arcing occur. Heat is generated thereby and chemical compounds are formed on the surface of the contact roll. These compounds insulate the contact roll from the sensing brushes which gradually decreases reliability of the sensing operation. Also, the sensing brush is normally composed of a bundle of wires which do not drop into a perforation at the same time. Often the circuit breaker may close the circuit before many of the wires have entered the perforation and therefore there are fewer wires for carrying the load current. This may cause timing difficulties and uneven brush wear.

The present invention has been designed to overcome the above-described difficulties and has as an object the provision of improved means for sensing perforations in a record.

Another object of this invention is to furnish an improved apparatus for sensing perforations in a record without requiring current flow through the sensing brushes.

Still another object of the invention resides in the provision of improved apparatus for sensing a record without the necessity of contact by the sensing brushes with an electrical circuit completing device.

A further object of the invention is to furnish improved means for sensing perforations in a record in which arcing at the tips of the sensing brushes is eliminated.

A still further object of the present invention is to provide improved means for dynamically sensing perforations in a record medium which is reliable in operation, simple in design and constructed in a manner for long life in operation.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a mechanical schematic diagram of a preferred embodiment of the present invention;

Figs. 2 and 3 are mechanical schematic diagrams of different embodiments of the invention; and Fig. 4 is an electrical schematic diagram of a load control circuit adapted to be used with any of the embodiments shown in Figs. 1 through 3.

Similar reference characters represent similar parts throughout the several views.

Referring to Fig. 1, two sensing units of a preferred embodiment of the invention are illustrated, the units being shown in staggered relationship so that adjacent columns of a record which are quite close together may be sensed. A description of one sensing unit will be made, it being understood that it applies equally to the other unit. The preferred embodiment of the invention is seen to comprise a magnet 10 having wire brushes 11 secured to one end thereof. Magnet 10 may be in the form of a permanent magnet or an electro-magnet and includes a North pole N and a South pole S. By way of example, if the North end of the magnet is considered to be connected to the brushes, then the free ends of the brushes are considered to be North poles. The brushes aforementioned may, by way of example, be constructed of hardened steel wire. However, it will be understood that other types of material in the para-magnetic group of materials may be used. The para-magnetic group of materials includes those materials which are ferro-magnetic.

An L-shaped core 12 which, by way of example, may be of iron, is provided below the free ends of brushes 11 and arranged so that the record 13 may pass between the brushes and the core. A pickup coil 14 is wound on core 12 and is provided with appropriate output terminals.

It will be understood that a plurality of holes or perforations may be provided in card 13, one of said holes being illustrated by reference numeral 15. The operation of the preferred embodiment is such that, as record 13 is moved in the direction indicated, conditions of registration and non-registration of the holes with the core and associated coil occur. During the non-registration condition, lines of flux to a certain degree are set up in said core and associated coil. When the free ends of the brushes enter holes 15, the flux density of the lines of flux in said core and associated coil changes. As this occurs, additional lines of flux cut the windings of coil 14 and an output signal is provided. The characteristics of the signal output from the coil is in the form of a damped oscillation. That is to say, the signal is an attenuated oscillation. When the free ends of the brushes leave the holes an output signal is obtained similar to the signal obtained upon brush entry into the hole, the difference being in that the two signals are in phase opposition.

Referring to Fig. 4, a schematic electric circuit is shown which is capable of utilizing the signals obtained at the terminals of coil 14. The output signals referred to above are rectified by diode 16 so that only the negative portions of said signals are allowed to pass therethrough. For example, a negative signal will be obtained, when the brushes enter the hole, which rapidly charges capacitor 17. The negative pulse is stretched by the combination of capacitor 17 and resistor 18 to a width determined by the RC combination. This wider negative pulse is applied to the control grid of a triode 20 in a manner to stop the conduction thereof. Thus, the plate output rises in potential, said plate output being RC coupled to the control grid of a thyratron 21.

In a conventional manner the plate circuit of thyratron 21 includes a load impedance 22 connected between the plate and a source of B+ electrical energy. A cam controlled circuit breaker 23 is adapted to make the connection of said source of electrical energy with said load and plate. This potential must exist across the tube at some time during the application of the positive signal which is applied to the control grid of the thyratron. When the positive voltage is applied to said control grid and the B+ voltage is placed between the plate and cathode of the thyratron, conduction occurs. The timing of circuit breaker 23 is such that at some time after conduction occurs the B+ voltage is disconnected from the plate. At this time the current through the load impedance 22 is cut off and the device operated thereby may return to its normal condition.

From the above it will be apparent that it is unnecessary that the free ends of the brushes actually engage the core 12. It is but necessary that a sufficient change in the lines of magnetic flux occurs about core 12 to induce a voltage in coil 14 which is capable of being used by the circuit shown in Fig. 4. This feature is indeed advantageous since brush contact and brush bounce are no longer a problem. There is no arcing at the tips of the brushes since there is only a change in the lines of flux. Furthermore, the requirement for precision accuracy in timing the entry of the sensing brush in the perforation and the make and break times of circuit breaker 23 is relaxed, this being due to the elimination of current flow through the sensing brushes.

The embodiment shown in Fig. 2 provides the same type of output signal as that furnished by the first embodiment but is of somewhat different construction. Here again two sensing units are illustrated in staggered relationship, the description of one unit which follows applying equally to the other unit. In this embodiment, a permanent magnet 24 is arranged so that laminated cores 25 and 26 extend from the North and South poles, respectively, of said magnet. Cores 25 and 26 are arranged so that their free ends are spaced apart slightly so that a magnetic field is set up thereacross. The aforementioned free ends may be moulded in a phenolic supporting and guiding plate 27 with the free ends flush with one side of said plate. The record card 13 is adapted to be moved adjacent said one side with the arrangement being such that perforation 15 is adapted to be moved past said free ends. A brush of magnetic material such as hardened steel wire is provided. The brush is illustrated by reference numeral 28 and has one end thereof secured to a stationary support member 29. The free end of brush 28 is adapted to be in juxtaposition to the air gap between the free ends of cores 25 and 26, being separated from said air gap by said card until a perforation moves past the air gap and allows the free end of the brush to enter therein. A pickup coil 30 is wound on one of the laminated cores, Fig. 2 showing the coil on core 26.

The operation of the embodiment shown in Fig. 2 will now be described. The record card is adapted to be moved between the card guide 27 and the free end of the brush. When the aforementioned free end of the brush enters perforations 15, the reluctance of the magnetic path between the free ends of cores 25 and 26 is reduced, thereby increasing the lines of flux in core 26 and causing an output signal to be supplied from pickup coil 30. This coil has an output identical with that obtained from coil 14 in Fig. 1 and may be associated with the circuit of Fig. 4 for control purposes. Here again, it is unnecessary for the free ends of the sensing brushes to engage the free ends of the cores 25 and 26. It is but essential that sufficient relative motion be provided therebetween for producing the required output voltage.

A third embodiment of the invention is shown in Fig. 3. This embodiment is somewhat similar to the embodiment shown in Fig. 2 and includes magnet 24, cores 25 and 26 and output coil 30. The record card is illustrated by reference numeral 31 and is shown to include a thickness of paper stock 33 having a layer of magnetic material 32 positioned thereover. The magnetic material may be applied to the regular card stock in a number of ways.

As card 31 is moved across the air gap between the cores the magnetic coating 32 closes the magnetic flux path across the air gap. When a perforation 34 is moved past said air gap the reluctance of the magnetic path across the air gap increases, causing an output signal to be fed to the circuit of Fig. 4.

In the embodiment in Fig. 3 shown and described above, only one sensing device has been shown for sensing the perforations in a single column. It will be understood, however, that a plurality of the sensing devices may be arranged in a staggered relation as pointed out relative to Figs. 1 and 2. The configuration of all of the sensing devices has been designed such that the staggered relation is particularly suitable. That is, the pickup coils of adjacent sensing devices are arranged on opposite sides of a perforation being sensed. In this manner the sensing devices may be positioned closer to each other. Referring to Fig. 1, the foot portions 12a of cores 12 are placed in side-by-side relation but extending in opposite directions. While only one sensing brush is shown it will be understood that a sensing brush is to be provided for each of the cores. It will be understood that a plurality of the brushes may be connected to one magnet so as to facilitate the application of the magnetism to the brushes. The sensing units may also be placed in a single row in side-by-side relation if spacing of the perforations in the record permits.

From the above it will seen that there is provided new and novel means for sensing perforations in a record. The sensing brushes may be constructed of a material which has long life and the arrangement is such that the tips of the brushes are no longer required to make electrical contact with a circuit completing device. It is only necessary that the brushes enter the perforations and move at least a predetermined distance toward a sensing device. In one embodiment the sensing device has an air gap across which a magnetic field is set up. As the brush tips move closer to the air gap the reluctance of the magnetic path across the air gap changes. This causes an output pulse to be supplied from a pickup coil associated with the sensing device. This output pulse may then be rectified, amplified and supplied to a thyratron for controlling a relay device. In another embodiment the sensing brush is magnetized and is moved closer to the core of a pickup coil as it enters the perforation, causing a pulse to be supplied from the coil to be utilized in a manner previously described. In another embodiment a magnetic coating is applied to the record card which provides a flux path for a magnetic field across the air gap of a sensing device. When a perforation becomes aligned with the air gap, the flux path is decreased since there is no magnetic coating. At this time a pickup coil associated with the sensing device provides an output pulse for control purposes.

It has also been shown that a plurality of these sensing devices may be arranged to sense the perforations in a number of columns in a record. Thus, by way of example, all eighty columns of a standard record card may be dynamically sensed.

The present invention provides high output potentials to the control circuit. By way of example, a change of potential in the order of one-half volt has been obtained out of the pickup coil. The invention readily lends itself to being pluggable since it provides a low impedance source. The brushes form the only wearing part and even this is negligible over the life of the machine upon which the invention is mounted. Only slight pressure is necessary since there is no longer the worry of contact resistance as in prior devices. This minimizes card and brush wear. The invention has the further advantages of extreme reliability and relatively low cost.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus for sensing non-magnetic records having perforations therein, a sensing station including a core and associated coil means, said core and associated coil means having magnetic lines of flux therein, said non-magnetic record being adapted to move relative to said sensing station so that there are conditions of registration and non-registration of said perforations with said sensing station, and means for increasing the lines of flux in said core and coil means upon transition from said condition of non-registration to said condition of registration.

2. An apparatus for sensing records having perforations therein comprising a sensing station including a core having coil means associated therewith, said records being adapted to have movement relative to said sensing station so that said perforations move past said core, brush means mounted to be spaced from said core by said record and to be moved toward said core when said brush means enter said perforations, and means for setting up magnetic lines of flux between said brush means and said core, said lines of flux being varied with relative movement of said brush means and said core, thereby causing an output signal from said coil means.

3. In an apparatus for sensing records having perforations therein, a sensing station including a core and associated coil means, said core and associated coil means having magnetic lines of flux therein, said record being adapted to move relative to said sensing stations so that there are conditions of registration and nonregistration said perforations with said sensing station, and brush means arranged to move into and out of said perforations in passing from one condition to the other for varying the lines of flux in said core and coil means.

4. In an apparatus for sensing records having perforations therein, a sensing station including a core and associated coil means, said core and associated coil means having magnetic lines of flux therein, said record being adapted to move relative to said sensing stations so that there are conditions of registration and nonregistration of said perforations with said sensing station, and brush means of a magnetic material arranged to move into said perforations upon transition from a condition of non-registration to a condition of registration, said brush means varying the reluctance of the path of said lines of flux to provide an output signal from said coil means.

5. In an apparatus for sensing records having perforations therein, a sensing station including a core and associated coil means, said core and associated coil means having magnetic lines of flux therein, said record being adapted to move relative to said sensing stations so that there are conditions of registration and non-registration of said perforations with said sensing station, and brush means of a magnetic material arranged to move into said perforations upon transition from said condition of non-registration to said condition of registration so as to vary the flux density of said lines of flux.

6. In an apparatus for sensing records having perforations therein, a sensing station including a core and associated coil means, said record being adapted to move relative to said sensing stations so that there are conditions of registration and non-registration of said perforations with said sensing station, brush means of a magnetic material having magnetic lines of flux therein and arranged to move into said perforations upon transition from one of said conditions to the other, said brush means setting up lines of flux in said core and coil means which are varied by movement of said brush means into said perforations.

7. In apparatus for sensing a record having perforations therein, said apparatus comprising a sensing station past which said perforations are adapted to be moved, said sensing station comprising a core having coil means associated therewith, and second means associated with said core for setting up magnetic lines of flux in said coil means, said second means being mounted to enter the perforations in said record as said perforations move past said sensing station for varying the magnetic lines of flux in said coil means and causing an output signal therefrom.

References Cited in the file of this patent

UNITED STATES PATENTS

| 2,294,681 | Moon | Sept. 1, 1942 |
| 2,488,277 | Falk et al. | Nov. 15, 1949 |
| 2,547,838 | Russell | Apr. 3, 1951 |

FOREIGN PATENTS

| 542,608 | Great Britain | Jan. 19, 1942 |